(12) United States Patent
Maruoka et al.

(10) Patent No.: US 9,082,021 B2
(45) Date of Patent: Jul. 14, 2015

(54) OBSTACLE ALERT DEVICE

(75) Inventors: Tetsuya Maruoka, Anjo (JP); Akira Kadoya, Kitanagoya (JP); Keigo Ikeda, Anjo (JP)

(73) Assignee: AISIN SEIKI KABUSHIKI KAISHA, Aichi-ken (JP)

( * ) Notice: Subject to any disclaimer, the term of this patent is extended or adjusted under 35 U.S.C. 154(b) by 33 days.

(21) Appl. No.: 14/237,209

(22) PCT Filed: Nov. 1, 2011

(86) PCT No.: PCT/JP2011/075128
§ 371 (c)(1),
(2), (4) Date: Feb. 5, 2014

(87) PCT Pub. No.: WO2013/065123
PCT Pub. Date: May 10, 2013

(65) Prior Publication Data
US 2014/0205147 A1 Jul. 24, 2014

(51) Int. Cl.
*G06K 9/00* (2006.01)
*B60W 50/14* (2012.01)
(Continued)

(52) U.S. Cl.
CPC .............. *G06K 9/00805* (2013.01); *B60R 1/00* (2013.01); *B60W 50/14* (2013.01);
(Continued)

(58) Field of Classification Search
CPC .......... G06K 9/00791; G06K 9/00805; G06K 9/00362; B60W 50/14; B60W 2050/146
See application file for complete search history.

(56) References Cited

U.S. PATENT DOCUMENTS 5,166,533 A * 11/1992 Kajiwara .................. 250/559.05
6,757,008 B1 * 6/2004 Smith ............................ 348/143
(Continued)

FOREIGN PATENT DOCUMENTS

| JP | 11-115660 A | 4/1999 |
|----|-------------|--------|
| JP | 2009-40272 A | 2/2009 |

(Continued)

OTHER PUBLICATIONS

International Search Report for PCT/JP2011/075128 dated Dec. 13, 2011.
(Continued)

*Primary Examiner* — Utpal Shah
(74) *Attorney, Agent, or Firm* — Sughrue Mion, PLLC

(57) ABSTRACT

An obstacle alert device is capable of indicating clearly presence of an obstacle approaching a vehicle to a driver, without impairing visibility of a peripheral situation of the vehicle. The device includes a photographed image acquisition section acquiring a photographed image photographing a scene in the periphery of the vehicle, a photographed-image-of-interest generation section generating a photographed image of interest based on the photographed image, a masked region setting section setting a masked region making un-displayed at least a portion of the scene of the vehicle periphery in the photographed image of interest, an object presence determination section determining whether an object is present or not in an outside region outside the photographed image of interest, a clear indication image outputting section outputting a clear indication image including a clear indication indicator clearly indicating presence of the object to be displayed at an end of the photographed image of interest on the side of the outside region where the object is present in case the object in the outside region moves to the side of a region corresponding to the photographed image of interest, and a motion image outputting section outputting an image in which the clear indication indicator becomes absorbed from the side of the masked region where the object is present in case the object in the outside region has entered the region corresponding to the photographed image of interest.

3 Claims, 6 Drawing Sheets

(51) Int. Cl.
  *B60R 1/00* (2006.01)
  *G08G 1/16* (2006.01)

(52) U.S. Cl.
  CPC ....... *G06K 9/00362* (2013.01); *G06K 9/00791* (2013.01); *G08G 1/168* (2013.01); *B60R 2300/307* (2013.01); *B60R 2300/806* (2013.01); *B60R 2300/8093* (2013.01)

(56) References Cited

U.S. PATENT DOCUMENTS

| | | | | |
|---|---|---|---|---|
| 8,395,529 | B2* | 3/2013 | Seder et al. | 340/905 |
| 2007/0139523 | A1* | 6/2007 | Nishida et al. | 348/148 |
| 2007/0263902 | A1* | 11/2007 | Higuchi et al. | 382/104 |
| 2009/0059005 | A1* | 3/2009 | Hattori et al. | 348/148 |
| 2009/0073263 | A1* | 3/2009 | Harada et al. | 348/148 |
| 2009/0097708 | A1 | 4/2009 | Mizuta | |
| 2010/0245578 | A1* | 9/2010 | Kakinami | 348/148 |
| 2010/0253543 | A1* | 10/2010 | Szczerba et al. | 340/932.2 |
| 2010/0253602 | A1* | 10/2010 | Szczerba et al. | 345/8 |
| 2010/0289632 | A1* | 11/2010 | Seder et al. | 340/436 |
| 2012/0078513 | A1* | 3/2012 | Oaki et al. | 701/527 |

FOREIGN PATENT DOCUMENTS

| | | |
|---|---|---|
| JP | 2009-71790 A | 4/2009 |
| JP | 2009-100095 A | 5/2009 |
| JP | 2009-217740 A | 9/2009 |

OTHER PUBLICATIONS

English translation of International Preliminary Report on Patentability for PCT/JP2011/075128 dated May 15, 2014.

* cited by examiner

OBSTACLE ALERT DEVICE

CROSS REFERENCE TO RELATED APPLICATIONS

This application is a National Stage of International Application No. PCT/JP2011/075128 filed Nov. 1, 2011, the contents of which are incorporated herein by reference in their entirety.

TECHNICAL FIELD

The present invention relates to an obstacle alert device indicating clearly presence of an obstacle approaching a vehicle to a vehicle occupant.

BACKGROUND ART

In the periphery of a vehicle, there is a blind spot not visible from the position of a driver. Hence, the driver needs to pay great attention to the periphery of the vehicle during driving of the vehicle. In particular, when the vehicle is to be parked by reversing, many users have awareness of not being good at parking operations per se, so they suffer from mental fatigue to no small extent. Then, conventionally, there has been taken advantage of a technique of monitoring an obstacle in the periphery of a vehicle (e.g. Patent Documents 1 and 2).

An obstacle alert device for a vehicle disclosed in Patent Document 1 includes a transversely moving obstacle detecting means, a transverse movement direction detecting means, and a transverse movement information providing means. The transversely moving obstacle detecting means detects an obstacle which is moving in a direction transverse to the traveling direction in front of the vehicle. The transverse movement direction detecting means detects the transverse movement direction of the obstacle detected by the transversely moving obstacle detecting means. The transverse movement information providing means provides the driver with information relating to the transverse movement direction of the obstacle detected by the transverse movement direction detecting means. In this, the transverse movement information providing means causes a display unit to display in its monitoring screen an arrow representing the transverse movement direction detected by the transverse movement direction detecting means.

A vehicle periphery monitoring device disclosed in Patent Document 2 includes a photographing means, an obstacle detecting means and a displaying means. The photographing means photographs a vehicle periphery including a portion of a self vehicle. The obstacle detecting means detects an obstacle located in the vehicle periphery and calculates a distance between the detected obstacle and the self vehicle. The displaying means displays, in a single monitoring screen, the photographed image photographed by the photographing means and an obstacle displaying image indicative of the distance calculated by the obstacle detecting means.

PRIOR ART

Patent Documents

Patent Document 1: Japanese Unexamined Patent Application Publication No. 11-115660
Patent Document 2: Japanese Unexamined Patent Application Publication No. 2009-217740

SUMMARY OF THE INVENTION

Object to be Achieved by Invention

As shown by the techniques disclosed by Patent Document 1 and Patent Document 2, it is possible to alert a driver to presence of an obstacle in the vehicle periphery by detecting the obstacle in the vehicle periphery and displaying information (arrow or the like) indicating this obstacle clearly. However, the monitoring screen size of the display unit (displaying means) mounted on a vehicle is not so large. For this reason, if an arrow or the like showing the situation of the vehicle periphery shown on the monitoring screen is displayed on the image, this may make the vehicle periphery situation less visible or even make the grasping of the obstacle impossible.

The object of the present invention is to provide an obstacle alert device capable of indicating clearly presence of an obstacle approaching a vehicle to a driver, without impairing visibility of a peripheral situation of the vehicle.

Means for Achieving the Object

For achieving the above-noted object, according to a characterizing feature of an obstacle alert device relating to the present invention, the device comprises:

a photographed image acquisition section acquiring a photographed image photographing a scene in the periphery of the vehicle;

a photographed-image-of-interest generation section generating a photographed image of interest based on the photographed image;

a masked region setting section setting a masked region making un-displayed at least a portion of the scene of the vehicle periphery in the photographed image of interest;

an object presence determination section determining whether an object is present or not in an outside region outside the photographed image of interest;

a clear indication image outputting section outputting a clear indication image including a clear indication indicator clearly indicating presence of the object to be displayed at an end of the photographed image of interest on the side of the outside region where the object is present in case the moving direction determination section determines that the object in the outside region moves to the side of a region corresponding to the photographed image of interest; and a motion image outputting section outputting an image in which the clear indication indicator becomes absorbed from the side of the masked region where the object is present in case the object in the outside region has entered the region corresponding to the photographed image of interest.

With the above-described characterizing feature, even when the object is not shown in the monitoring screen of the displaying device (e.g. a monitor) mounted in the vehicle, at the time of entrance of the object approaching the vehicle has entered the photographic range, it is possible to clearly indicate the presence and the direction of the object approaching the vehicle to the driver, while displaying the situation in the periphery of the vehicle. Therefore, even when the monitoring screen size of the displaying device is small, an object approaching the vehicle will not be overlooked. Further, since the clear indication indicator is absorbed into the masked region in accordance with advancement of the object into the narrow viewing field range, the visibility of the object to the driver does not deteriorate. Therefore, it has become possible to indicate clearly presence of an obstacle (an object)

approaching a vehicle to a driver, without impairing visibility of a peripheral situation of the vehicle.

Preferably, the motion image outputting section is configured to change a displaying color of the masked region from a position where the clear indication indicator has been absorbed, in association with the absorption of the clear indication indicator into the masked region.

With the above arrangement, the displaying color of the masked region is changed gradually from the side on which the object is approaching. Hence, it becomes possible to alert the driver to the approaching of the object in an even more effective manner.

Further preferably, the masked region is set at an upper portion of the monitoring screen.

With the above arrangement, the visibility for the driver is increased even in the absorption process. Therefore, approaching of the object can be clearly indicated in an effective manner.

MODES OF EMBODYING THE INVENTION

Next, modes of embodying the present invention will be described in details. An obstacle alert device 100 relating to the present invention has a function of clearly indicating approaching of an object if any approaching a vehicle to the driver of this vehicle. Next, an explanation will be made with reference to the accompanying drawings.

Figure 1:
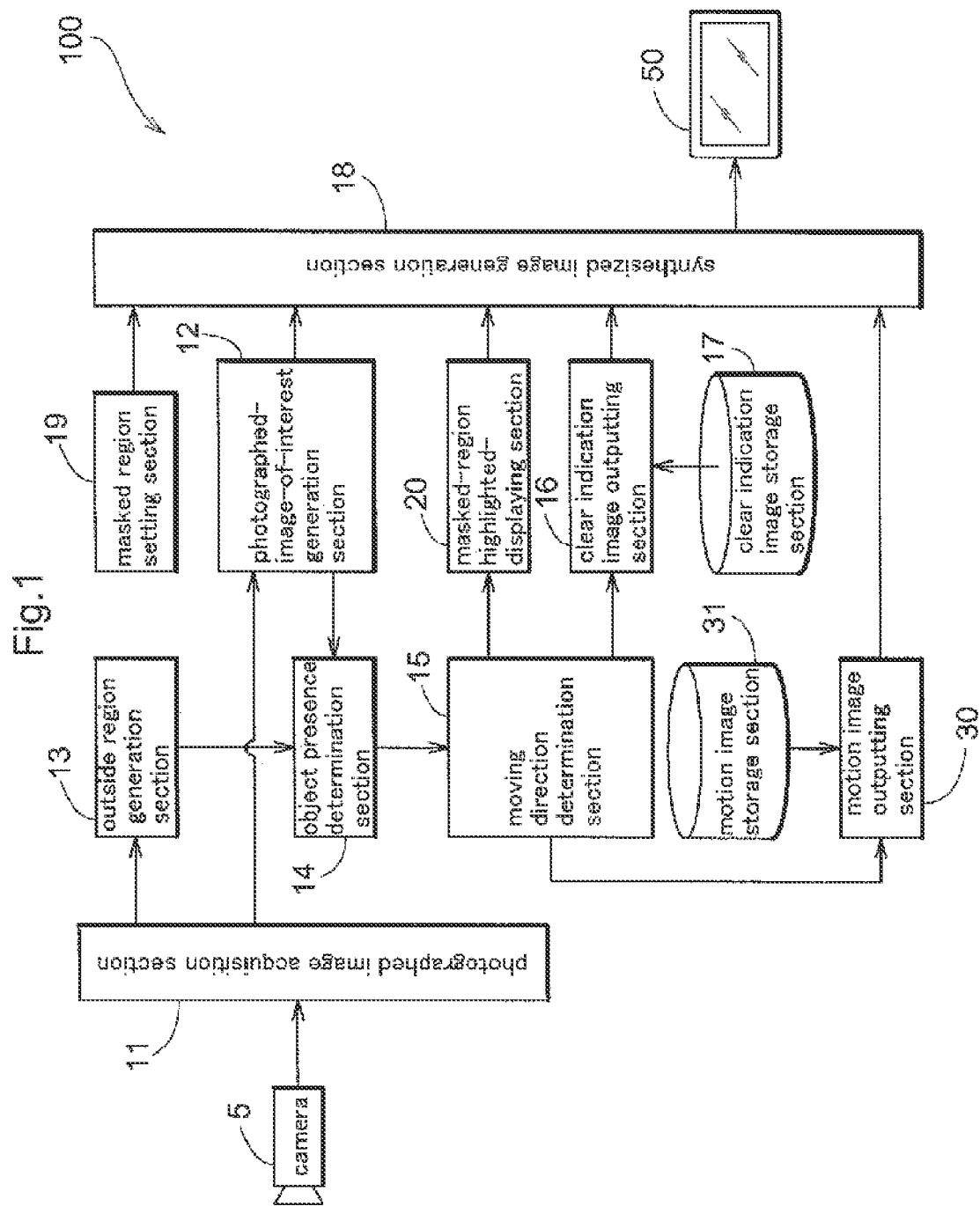
FIG. 1 is a block diagram schematically showing an arrangement of an obstacle alert device.

FIG. 1 is a block diagram schematically showing an arrangement of the obstacle alert device 100. As shown in FIG. 1, the obstacle alert device 100 includes respective functional sections of: a photographed image acquisition section 11, a photographed-image-of-interest generation section 12, an outside region generation section 13, an object presence determination section 14, a moving direction determination section 15, a clear indication image outputting section 16, a clear indication image storage section 17, a synthesized image generation section 18, a masked region setting section 19, a masked-region highlighted-displaying section 20, a motion image outputting section 30, and a motion image storage section 31. The respective functional sections are configured in the form of hardware having a CPU as a core component thereof and/or software for effecting various processes for indicating clearly approaching of an object 7 to the driver of the vehicle 1.

Figure 2:
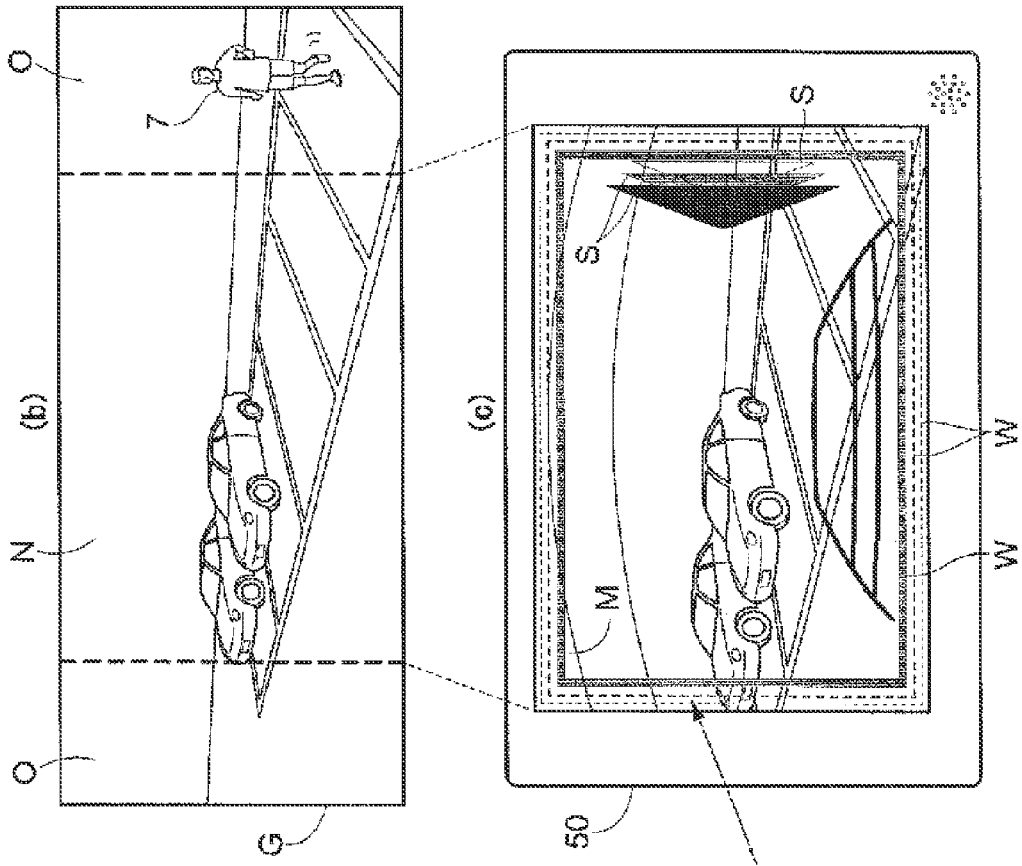
FIG. 2 is a view showing one example of a processing effected by the obstacle alert device.
Figure 2:
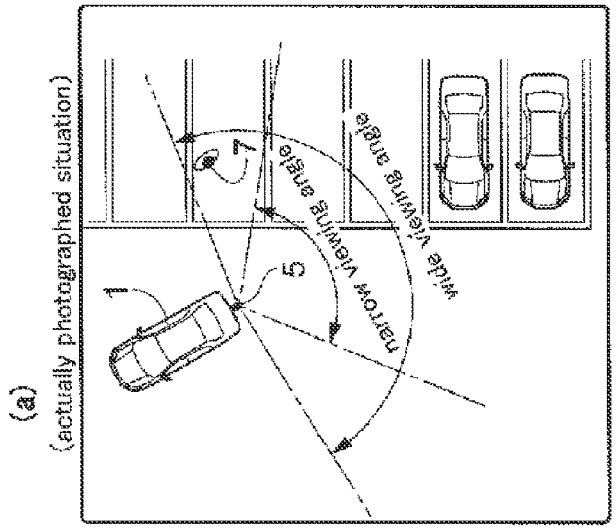
Figure 2:
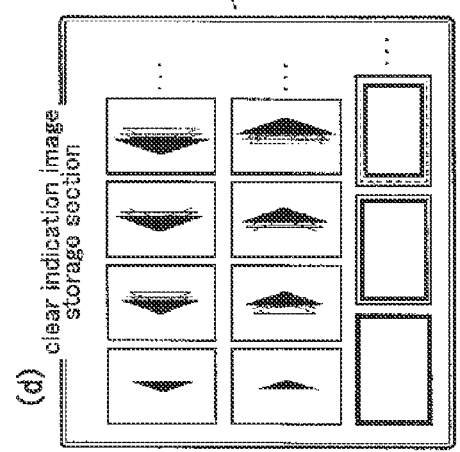

The photographed image acquisition section 11 acquires a photographed image G photographing a scene in the periphery of the vehicle 1 and comprises, in this case, a camera 5 mounted in the vehicle 1. The camera 5 employed in the instant embodiment incorporates an image capturing device such as a CCD (charged coupled derive) or a CIS (CMOS image sensor) and comprises a digital camera configured to output photographed information in the form of motion information. Such camera 5, as shown in FIG. 2 (a), is disposed e.g. adjacent a license plate attached to an outside rear portion of the vehicle 1 or adjacent an emblem plate attached to an outside rear portion of the vehicle 1, with the camera 5 being oriented toward the rear side of the vehicle 1 with a slight angle of depression. Further, this camera 5 has a wide-angle lens (not shown). With this, the camera 5 can photograph the scene in the periphery of the vehicle 1 over an approximately 180 degrees of angle rearwardly of the vehicle 1. Such photographic range is shown as "wide viewing angle" in FIG. 2 (a). This camera 5 has an ability of outputting motion image of photographed images G in real time. Such photographed image G is transmitted to the photographed image acquisition section 11.

One example of the photographed image G is shown in FIG. 2(b). The total width of FIG. 2 (b) corresponds to the wide viewing angle shown in FIG. 2 (a). Here, the photographed image G is subject to a mirror processing such that an object 7 present on the left side as the vehicle 1 as shown in FIG. 2 (a) is viewed from the rear side thereof will appear on the right side within the photographed image G as shown in FIG. 2 (b). This is done for facilitating sensory recognition for the driver of the vehicle 1 to determine whether the object 7 included in the photographed image G is present on the left side or the right side of the vehicle 1, when the scene rearwardly of the vehicle 1 is to be displayed on the monitor 50.

Referring back to FIG. 1, the photographed-image-of-interest generation section 12 generates a photographed image of interest based on the photographed image G. In the instant embodiment, the photographic range of the photographed image G is a wide viewing angle. For this reason, the photographed-image-of-interest generation section 12 generates, as a photographed image of interest, a narrow field-of-vision region N which is the center portion of the photographed image G. The photographed image G is transmitted from the photographed image acquisition section 11. In the instant embodiment, the photographed image of interest corresponds to the transversely center portion of the photographed image G shown in FIG. 2 (b). Advantageously, this narrow field-of-vision region N is set as a region ranging from about 120 to 130 degrees, rearwardly of the vehicle 1, like the "narrow field-of-vision region" shown in FIG. 1 (a). Further, as this narrow field-of-vision region N approximates the range of possible traveling for the vehicle 1 when it travels backwards, thus constituting a region of particular interest in the photographed image G; hence, this region will be referred to as "a photographed image of interest". Such photographed image of interest corresponds to a displaying image to be displayed on a monitor 50 to be described later (see FIG. 2 (c)). Incidentally, in the instant embodiment, "the photographed image of interest" will be explained as the image of "narrow viewing angle range".

The outside region generation section 13 generates an outside region O on the outside of the photographed image of interest. That is, the section 13 generates the outside region O outside the narrow field-of-vision region N in the photographed image G. As described above, at the transversely center portion of the photographed image G, the photographed-image-of-interest generation section 12 generates the narrow field-of-vision region N. Then, on the outside of this narrow field-of-vision region N, the outside region generation section 13 generates the outside region O such as the one shown in FIG. 2 (b). The outside region O generated by the outside region generation section 13 is transmitted to the object presence determination section 14 to be described later.

The object presence determination section 14 determines whether an object 7 is present in the outside region O or not. The outside region O is transmitted from the outside region generation section 13. This determination of presence/absence of the object 7 can be done with using a known image recognition process such as a pattern matching. Needless to say, it is also possible to determine whether an object 7 is present in the outside region O or not by using any other processing than the pattern matching. The result of this determination by the object presence determination section 14 is transmitted to the moving direction determination section 15 to be described later.

The moving direction determination section 15 determines the moving direction of the object 7 in the outside region O. This determination of moving direction is effected when the object presence determination section 14 has determined presence of an object 7 in the outside region O. In particular, in the instant embodiment, the moving direction determination section 15 determines whether the object 7 in the outside region O is moving toward the narrow field-of-vision region N or not. Moving toward the narrow field-of-vision region N refers to movement from the width-wise outer side of the vehicle 1 along the direction immediately rearwardly of the vehicle 1. Such determination can be made by e.g. comparing the position of the object 7 in the current photographed image G and the position of this object 7 in a photographed image G acquired before a predetermined period, or can be made by using such a known technique as the optical flow technique. And, the result of this moving direction determination is transmitted to a clear indication image outputting section 16 to be described later.

The clear indication image outputting section 16 causes a clear indication image including a clear indication indicator clearly indicating presence of the object 7 to be displayed at an end of the photographed image of interest on the side of the outside region O where the object 7 is present, in case this object 7 in the outside region O moves toward the side of the region corresponding to the photographed image of interest. Here, in the instant embodiment, the photographed image of interest corresponds to the narrow field-of-vision region N. Therefore, the clear indication image outputting section 16 causes the clear indication indicator clearly indicating presence of the object 7 to be displayed at the end on the side of the outside region O where the object 7 in the photographed image of interest is present, in case this object 7 in the outside region O moves toward the side of the narrow field-of-vision region N. The determination whether the object 7 in the outside region O moves toward the side of the narrow field-of-vision region N of the vehicle 1 or not is effected by the moving direction determination section 15. The side of the narrow field-of-vision region N on the side of the outside region O where the object 7 is present corresponds to the left side region within the narrow field-of-vision region N in case the object 7 is present in the left outside region O. On the other hand, the side corresponds to the right side region within the narrow field-of-vision region N in case the object 7 is present in the right outside region O.

In the instant embodiment, in case an object 7 present in the outside region O is moving toward the narrow field-of-region region N of the vehicle 1, the clear indication image outputting section 16 causes an indicator S which is illuminated for a predetermined period and then disilluminated, to be displayed at different positions sequentially in the narrow field-of-region region N from the side of the outside region O where the object 7 is present towards the center side thereof; and the section 16 effects this displaying in repetition.

The indicator S which is illuminated for a predetermined period and then disilluminated refers to the indicator S being displayed in flashing, i.e. on and off, rather than being displayed continuously. In the instant embodiment, in case such indicator S is displayed and then disilluminated and then displayed again, the indicator S is displayed at different positions. Therefore, the indicator S will appear as if moving with flashing between predetermined two positions on the monitoring screen. The clear indication image outputting section 16 effects such movement of the indicator S with its flashing, in repetition.

Next, the indicator S will be explained. The indicator S relating to the instant embodiment is configured in the form of an arrow having a projecting portion projecting on the center side of the photographed image of interest (narrow field-of-vision region N). Such indicator S is stored in the clear indication image storage section 17 as shown in FIG. 2 (d). FIG. 2 (c) shows an image to be displayed on the monitor 50 of the vehicle 1 in case the object 7 is preset in the photographed image G shown in FIG. 2 (b), that is, in the right outside region O. As shown in FIG. 2 (c), in the instant embodiment, there may arise an occasion when a plurality of indicators S are displayed on the monitor 50. In such case, in the instant embodiment, the multiple indicators S will be displayed at positions where these indicators S are partially overlapped with each other. In this embodiment, the language "partially overlapped" is understood to mean that of the multiple indicators S, the projecting side portion of the arrow shape of one indicator is overlapped with a non-projecting side portion of the arrow shape of another indicator. Further, in case there are provided a plurality of indicators S, as for the overlapped portion between the indicator S displayed later and the indicator S displayed earlier, the displaying will be effected in an overwriting manner. That is, an arrangement will be provided such that the later-displayed indicator S will be disposed at a layer upwardly of a layer where the earlier-displayed indicator S is disposed. In the instant embodiment, such indicator S displayed immediately before will be displayed with higher transparency than the subsequently displayed indicator S. Namely, the subsequently displayed indicator S will be displayed with lower transparency than the indicator displayed immediately before. Therefore, when multiple indicators S are displayed at a time, the indicator S in the uppermost layer has the lowest transparency and the indicator S in the lowermost layer has the highest transparency.

Further, the subsequently displayed indicator S will be provided in a larger size than the indicator displayed immediately before. Therefore, when multiple indicators S are displayed at a time, the indicator S in the uppermost layer has the largest size and the indicator S in the lowermost layer has the smallest size. Incidentally, the largeness/smallness of the sizes of the respective indicators S may be set in mutually similar shapes. Alternatively, the largeness/smallness of the sizes may be varied by changing either one of the vertical and lateral lengths of the indicator S.

The clear indication image outputting section 16 effects such displaying in repetition. Here, in the instant embodiment, as shown in FIG. 2 (c), the indicator S is displayed on the monitor 50 with the indicator S being synthesized with the photographed image of interest as the narrow field-of-vision region N. Hence, the synthesized image generation section 18 generates a synthesized image synthesizing the indicator S with the photographed image of interest. With this, there will be generated an image such as one shown in FIG. 2 (c).

With the above-described displaying of the indicator(s) S, it becomes possible to display the indicator S as if it became larger and larger. With this, it is possible to clearly indicate visually to an occupant of the vehicle 1 approaching of the object 7 toward this vehicle 1.

Moreover, in case the moving direction determination section 15 has determined that the object 7 in the outside region O is moving toward the center side of the photographed image of interest, the clear indication image outputting section 16 causes a frame indicator W which has a smaller contour than the contour of the photographed image of interest and which is illuminated for a predetermined period and then disilluminated, to be displayed at different positions sequentially, from the outer edge of the photographed image of interest towards the center side thereof and effects this displaying in repetition. Here, in the instant embodiment, the photographed image of interest corresponds to the narrow field-of-vision region N. Therefore, in case the object 7 in the outside region O is moving toward the narrow field-of-vision region N, the clear indication image outputting section 16 causes the frame indicator W which has a smaller contour than the contour of the narrow field-of-view region N and which is illuminated for a predetermined period and then disilluminated, to be displayed at different positions sequentially, from the outer edge of the narrow field-of-vision region N towards the center side thereof and effects this displaying in repetition. Here, as described above, the monitor 50 displays the photographed image of interest which is the narrow field-of-vision region N. Accordingly, the language "frame indicator W which has a smaller contour than the contour of the narrow field-of-vision N" is understood to mean the frame indicator W having a smaller size than the monitoring screen size of the monitor 50. The determination whether the object 7 in the outside region O moves towards the side of the narrow field-of-vision region N of the vehicle 1 or not is effected by the moving direction determination section 15 described above.

The frame indicator W which is illuminated for a predetermined period and then disilluminated refers to the fame indicator W being displayed in flashing, i.e. on and off, rather than being displayed continuously. In the instant embodiment, in case such frame indicator W is displayed and then disilluminated and then displayed again, the frame indicator W is displayed at different center-side positions. Therefore, the frame indicator W will appear as if it became smaller and smaller. The clear indication image outputting section 16 effects such movement of the frame indicator W with its flashing, in repetition.

Next, the frame indicator W will be explained. The frame indicator W relating to the instant embodiment has a smaller contour than the contour of the photographed image of interest (narrow field-of-vision region N). As shown in FIG. 2 (c), in the instant embodiment, there may arise an occasion when a plurality of frame indicators W are displayed on the monitor 50. In such case, a subsequently displayed frame indicator W will have a smaller size than a frame indicator W displayed immediately before. Further, the subsequently displayed frame indicator W will be displayed with lower transparency than the indicator displayed immediately before. This arrangement makes it possible to provide a mode of displaying showing as if the frame indicator W popped out from the center of the monitoring screen. Incidentally, such frame indicator W is stored in the clear indication image storage section 17 as shown in FIG. 2 (d).

The clear indication image outputting section 16 effects such displaying above in repetition. Here, in the instant embodiment, as shown in FIG. 2 (d), the frame indicator W is displayed on the monitor 50 with the frame indicator W being synthesized with the photographed image of interest as the narrow field-of-vision region N. Hence, the synthesized image generation section 18 generates a synthesized image synthesizing the frame indicator W with the photographed image of interest. With this, there will be generated an image such as the one shown in FIG. 2 (c).

The masked region setting section 19 sets a masked region M making un-displayed at least a portion of the scene of the vehicle 1 periphery in the photographed image of interest. In the instant embodiment, the masked region M is set at an upper portion of the displaying screen, i.e. an upper portion within the photographed image of interest, as shown in FIG. 2 (c). This masked region M is formed over the opposed sides in the transverse direction of the photographed image of interest. The inner side of the masked region M will be painted in e.g. black color so as to mask the scene upwardly of the vehicle 1. Needless to say, it may be painted in a different color.

Figure 3:
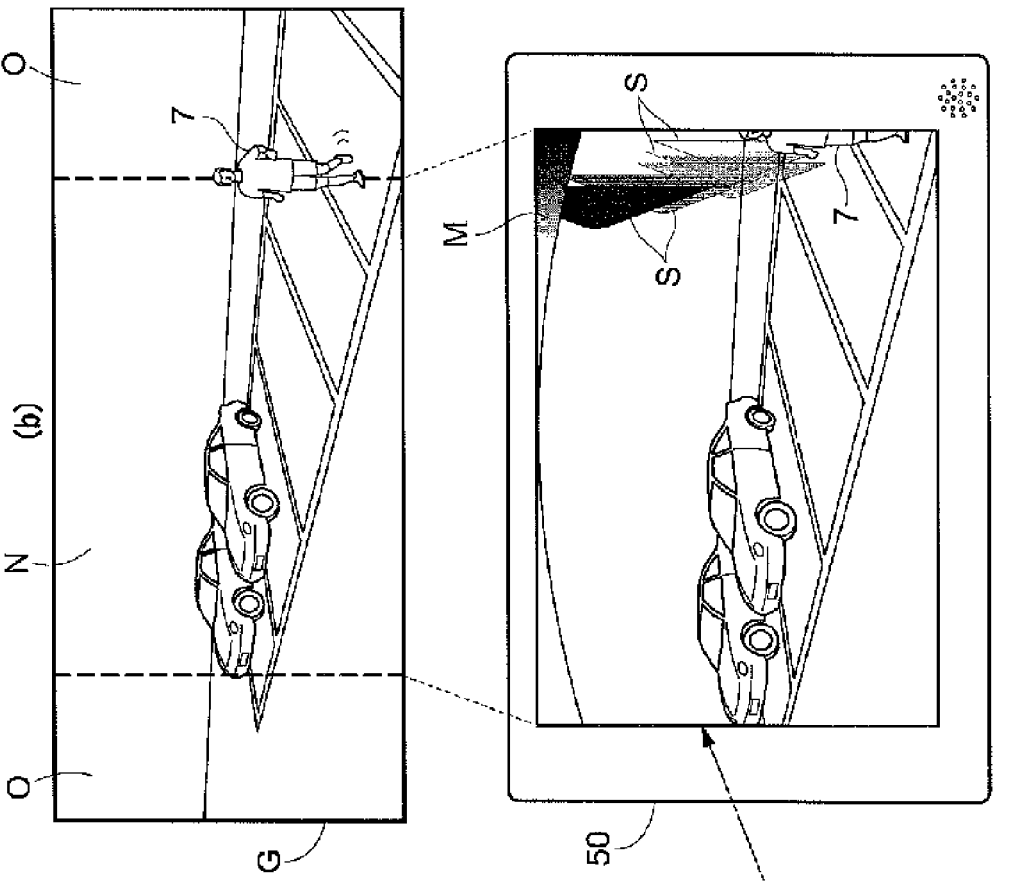
FIG. 3 is a view showing one example of a processing effected by the obstacle alert device.
Figure 3:
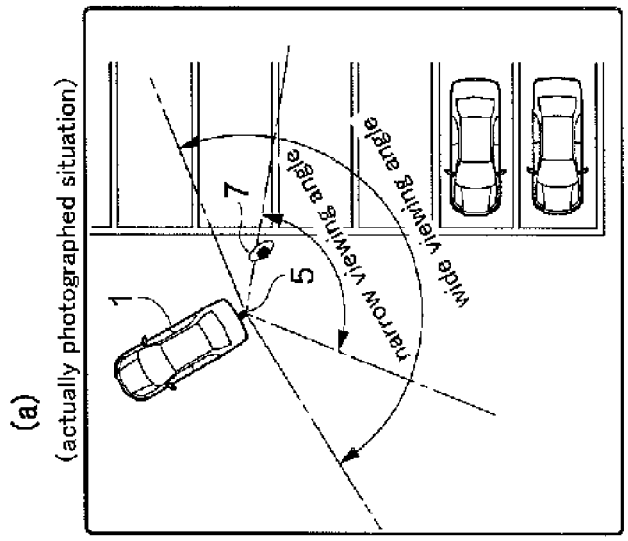
Figure 3:
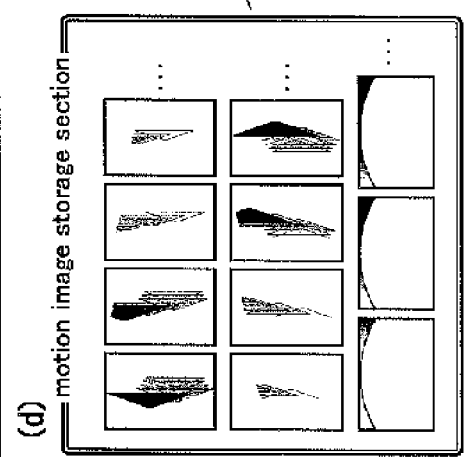

The motion image outputting section 30 outputs an image in which the clear indication indicator becomes absorbed from the side of the masked region M where the object 7 is present in case the object 7 in the outside region O has entered the region corresponding to the photographed image of interest, that is, the narrow field-of-vision region N (see FIG. 3 (d)). Whether the object 7 in the outside region O has entered the narrow field-of-vision region N or not is determined by the moving direction determination section 15. The clear indication indicator corresponds to the indicator S which is displayed on the monitor 50 in case the object 7 has entered the narrow field-of-vision region N. The side of the masked region M where the object 7 is present means the right side of the masked region M in case the object 7 is present in the right outside region O or means the left side of the masked region M in case the object 7 is present in the left outside region O. The image to be absorbed means an image in which the indicator S gets absorbed or merged into the masked region M to disappear eventually therein. Such image is stored in advance in the motion image storage section 31.

Here, if the object 7 has entered the narrow field-of-view region N, the object 7 will be displayed at the end of the photographed image of interest. Therefore, as shown in FIG. 3 (c), as the indicator S is absorbed into the masked region M when the object 7 has entered the narrow field-of-view region N, it becomes possible to display the object 7 displayed at the end of the narrow field-of-vision region N without being masked by the clear indication indicator. Consequently, it becomes possible to clearly indicate the presence of the object 7 to the driver of the vehicle 1 in an appropriate manner.

Further, the motion image outputting section 30 is configured to change the displaying color of the masked region M from the position at which the clear indication indicator has been absorbed, in association with the absorption of the clear indication indicator into the masked region M. More particularly, in case the clear indication indicator was absorbed from the right side of the masked region M, there will be outputted an image which colors the masked region M from the right side to the left side. Conversely, in case the clear indication indicator was absorbed from the left side of the masked region M, there will be outputted an image which colors the masked region M from the left side to the right side. With such coloration of the masked region M as above, it becomes possible to clearly indicate to the driver of the vehicle 1 the entering side of the object 7 as well.

Figure 4:
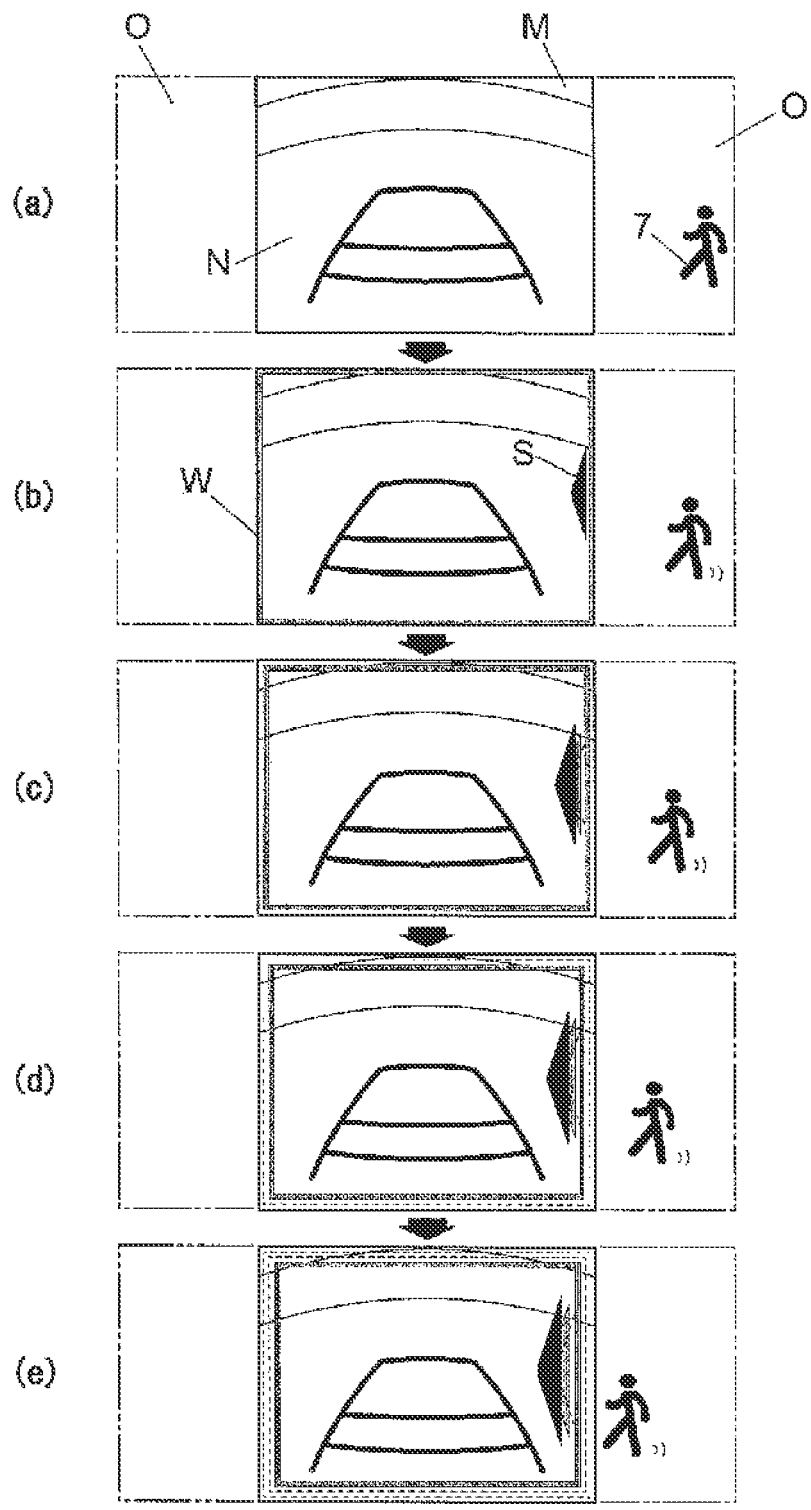
FIG. 4 is a view showing one example of a synthesized image.
Figure 5:
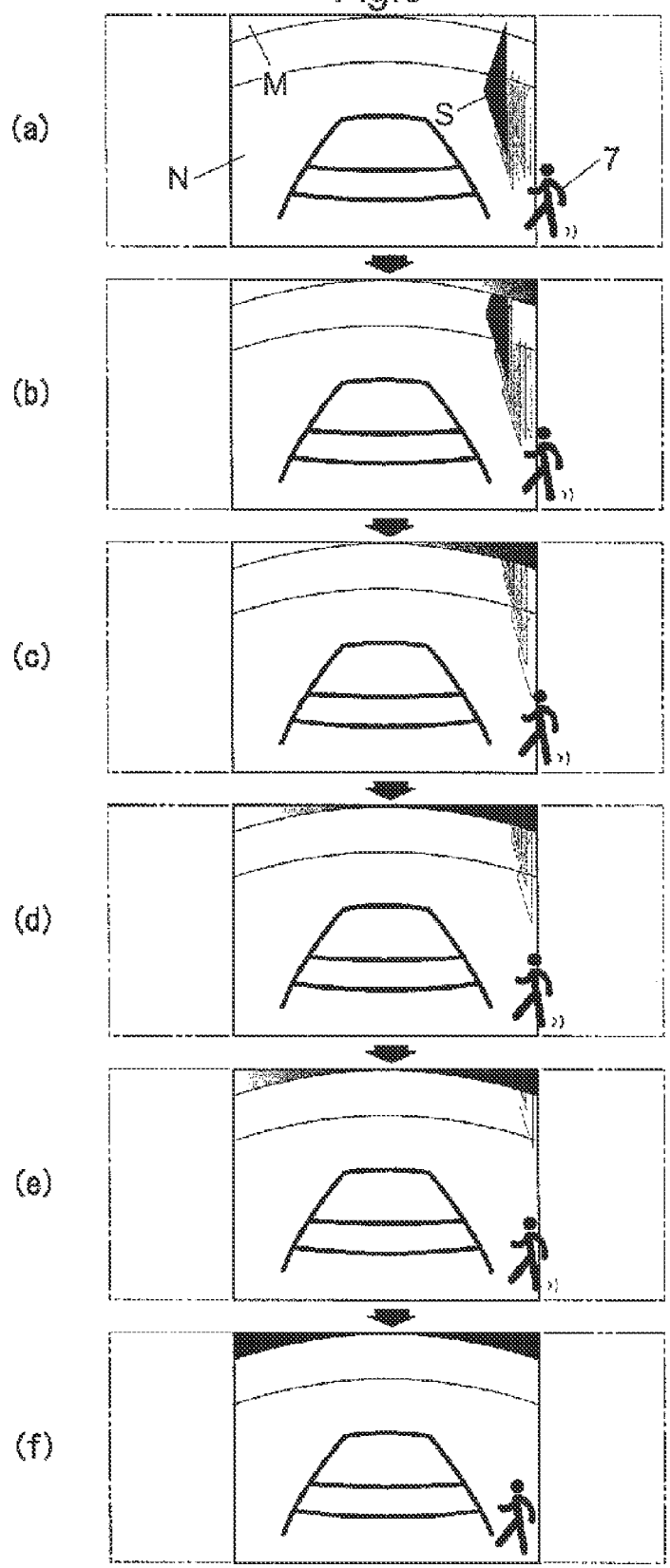
FIG. 5 is a view showing one example of a synthesized image.

Examples of a series of images in which the clear indication indicator enters the masked region M and this masked region M is colored are illustrated in FIG. 4 and FIG. 5. FIG. 4 illustrates an example in which case the object 7 in the outside region O is moving toward the narrow field-of-view region N, the indicator S and the frame indicator W are displayed in an superimposed manner in the narrow field-ofview region N. As shown in FIG. 5 (a), when the object 7 has entered the narrow field-of-view region N from the right outside region O, the superimposition of the frame indicator W is finished. Further, as shown in FIGS. 5 (b) through (e), the indicator S enters the masked region M as if it were progressively absorbed from the right side of the masked region M. In accordance with this, the masked region M is colored progressively from the right side thereof and eventually, the entire masked region M is colored (FIG. 5 (f)).

Referring now back to FIG. 1, the masked-region highlighted-displaying section 20 causes the masked region M to be displayed with highlight in case the object 7 in the outside region O has entered the region corresponding to the photographed image of interest, that is, the narrow field-of-vision region N. In this embodiment, the highlighted displaying, i.e. displaying with highlight, is a flashing displaying. Determination of whether the object 7 in the outside region O has entered the narrow field-of-vision region N or not is effected by the moving direction determination section 15. Then, in accordance with the determination result of the moving direction determination section 15, the masked region highlighted-displaying section 20 causes the masked region M to be displayed with flashing on and off. With this, it is possible to clearly indicate to the driver of the vehicle 1 visually the presence of the object 7 in the narrow field-of-vision region N, so that the driver can be alerted.

Further, the masked region highlighted-displaying section 20 stops the highlighted displaying of the masked region M in case the object 7 has exited the region corresponding the photographed image of interest, that is, the narrow field-of-vision region N. Determination of whether the object 7 has exited the narrow field-of-vision region N or not too can be effected by the moving direction determination section 15. That is, the moving direction determination section 15 can determine that the object 7 has exited the narrow field-of-vision region N if there is an object 7 moving into the outside region O from the side of the narrow field-of-vision region N of the outside region O. The result of this determination too is transmitted to the masked region highlighted-displaying section 20. Further, in the instant embodiment, the highlighted displaying is a flashing displaying. Accordingly, upon receipt of such determination result as above transmitted thereto, the masked region highlighted-displaying section 20 stops the flashing on/off of the masked region M. With this, it becomes possible to indicate clearly to the driver of the vehicle 1 absence of the object 7 in the narrow field-of-vision region N.

Figure 6:
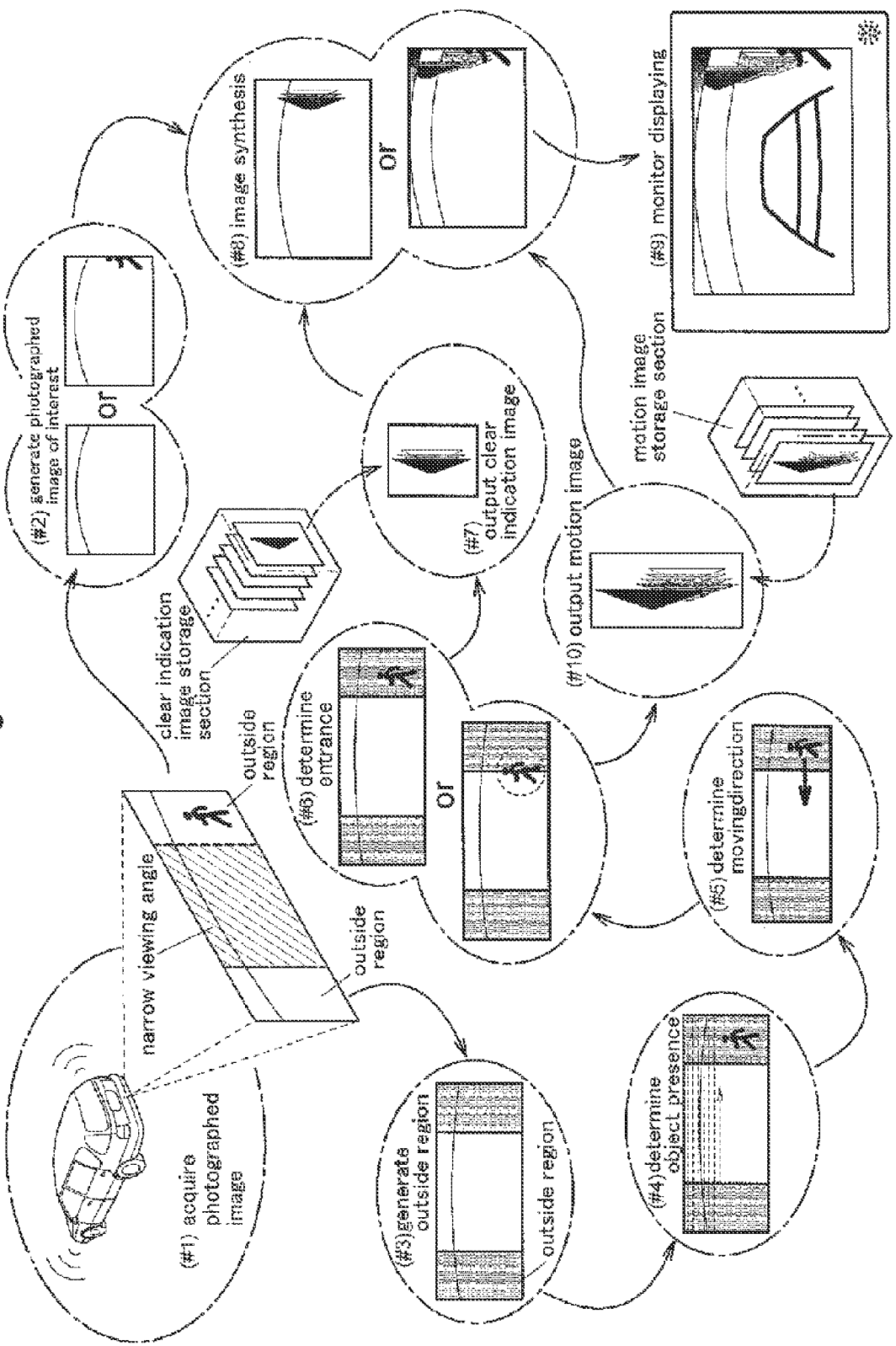
FIG. 6 is a view schematically showing a processing effected by the obstacle alert device.

Next, there will be explained a series of processes effected by the obstacle alert device 100 to display a synthesized image including the clear indication image superimposed on the photographed image of interest superimposed on the monitor 50, with reference to the diagram of FIG. 6. Firstly, the photographed image acquisition section 11 acquires a photographed image G photographed by the camera 5 of the vehicle 1 (step #1).

Next, the photographed-image-of-interest generation section 12 generates the center portion of the acquired photographed image G as a photographed image of interest (step #2). On the other hand, the outside region generation section 13 generates the transversely opposed portions of the acquired photographed image G as an outside region O (step #03). Then, the object presence determination section 14 determines whether an object 7 is present in the outside region O thus generated (step #04).

Subsequent to the determination of presence of the object 7 in the outside region O, the moving direction determination section 15 determines the moving direction of this object 7 (step #5). In case the moving direction of the object 7 is the direction from the outside region O toward the narrow field-of-vision region N corresponding to the photographed image of interest, it is further determined whether the object 7 has entered the narrow field-of-vision region N or not (step #6). If it is determined that the object 7 has not entered the narrow field-of-vision region N, the clear indication image outputting section 16 outputs the clear indication image (step #7). This clear indication image is outputted with reference to a clear indication image stored in the clear indication image storage section 17.

The synthesized image generation section 18 generates a synthesized image by superimposing the clear indication image outputted at step #6 on the photographed image of interest generated at step #2 (step #8). The synthesized image thus generated is displayed on the monitor 50 (step #9).

On the other hand, if it is determined at step #6 that the object 7 has entered the narrow field-of-vision region N, then, the motion image outputting section 30 outputs a motion image (step#10). This motion image is outputted with reference to motion images stored in the motion image storage section 31.

The synthesized image generation section 18 generates a synthesized image by superimposing the motion image outputted at step #10 on the photographed image of interest generated at step #2 (step #8). The synthesized image thus generated is displayed on the monitor 50 (step #9).

In this way, the clear indication indicator is caused to enter the masked region M in accordance with entrance of the object 7 to the narrow field-of-vision region N. Thus, it is possible to cause the driver of the vehicle 1 to pay close attention to the object 7 in the narrow field-of-vision region N. Consequently, the situation of the periphery of the vehicle 1 can be grasped.

In this way, with the obstacle alert device 100 relating to the present invention, even if the object 7 is not currently being shown within the monitoring screen of the monitor 50 provided in the vehicle 1, at the timing of entrance of the object 7 approaching the vehicle 1 into the photographic range, it is possible to clearly indicate to the driver the presence and the direction of the object 7 approaching the vehicle 1 with concurrently displaying the situation of the periphery of the vehicle 1. Therefore, even when the displaying screen size of the monitor 50 is small, the object 7 approaching the vehicle 1 will not be overlooked. Further, since the clear indication indicator gets absorbed into the masked region M in association with entrance of the object 7 into the narrow field-of-vision region N, the visibility of the object 7 for the driver will not deteriorate. Accordingly, it becomes possible to clearly indicate to the driver the presence of the obstacle (object 7) approaching the vehicle 1, without causing difficulty in viewing the situation of the periphery of the vehicle 1.

[Other Embodiments]

In the foregoing embodiment, it was explained that the clear indication image outputting section 16 displays in such a manner that as the indicator S displayed with flashing moves, the indicator S will be displayed with progressively increased size. However, the application of the present invention is not limited thereto. Alternatively, it is also possible as a matter of course to display the indicator S in a same size. Needless to say, it is also possible to display the indicator S with progressively decreased size. With such alternative arrangements too, it is possible to clearly indicate the object 7 approaching the vehicle 1 to the driver of the vehicle 1 appropriately.

In the foregoing embodiment, it was explained that the indicator S displayed immediately before has higher transparency than the indicator S displayed subsequently. However, the application of the present invention is not limited thereto. Alternatively, it is also possible as a matter of course to arrange such that the indicator S displayed immediately before has lower transparency than the indicator S displayed subsequently or the indicator S displayed immediately before has same transparency as the indicator S displayed subsequently.

In the foregoing embodiment, it was explained that in case a plurality of indicators S are provided, these multiple indicators S are displayed in a partially overlapped manner. However, the application of the present invention is not limited thereto. Alternatively, it is also possible to arrange such that even in case a plurality of indicators S are provided, these multiple indicators S are displayed in a non-overlapped manner.

In the foregoing embodiment, it was explained that the indicator S has an arrow-like shape with a projection projecting toward the center side of the narrow field-of-vision region N. However, the application of the present invention is not limited thereto. Alternatively, it is also possible to configure the indicator S with any other shape.

In the foregoing embodiment, it was explained that the motion image outputting section 30 is configured to change the displaying color of the masked region M from the position at which the clear indication indicator has been absorbed, in association with the absorption of the clear indication indicator into the masked region M. However, the application of the present invention is not limited thereto. Alternatively, it is also possible to configure the motion image outputting section 30 to change the displaying color of the masked region M from a position different from the position at which the clear indication indicator has been absorbed, in association with the absorption of the clear indication indicator into the masked region M. Further alternatively, it is also possible as a matter of course to configure the motion image outputting section 30 not to change the displaying color of the masked region M in spite of the absorption of the clear indication indicator into the masked region M.

In the foregoing embodiment, it was explained that the motion image outputting section 30 outputs an image in which the clear indication indicator becomes absorbed from the side of the masked region M where the object 7 is present, in case the object 7 in the outside region O has entered the narrow field-of-vision region N. However, the application of the present invention is not limited thereto. Alternatively, it is also possible as a matter of course to configure the motion image outputting section 30 to output an image in which the clear indication indicator becomes absorbed from the side of the masked region M where the object 7 is present, immediately before the object 7 enters the narrow field-of-vision region N. Further alternatively, it is also possible as a matter of course to display such that the clear indication indicator will appear behind the object 7. With such arrangement, there will occur no overlap between the clear indication indicator and the object 7. Therefore, it becomes possible to visibly recognize the object 7 even more clearly.

In the foregoing embodiment, it was explained that in some cases, multiple of indicators S and/or frame indicators W may be displayed in the monitoring screen. However, the application of the present invention is not limited thereto. Alternatively, it is also possible to display only one indicator S and one frame indicator W each in the monitoring screen or to display only the indicator S therein.

In the foregoing embodiment, it was explained that the determination of presence/absence of an object 7 can be done with suing a known image recognition process such as a pattern matching, etc. However, the application of the present invention is not limited thereto. Alternatively, it is also possible as a matter of course to effect detection by a sonar or the like for instance.

In the foregoing embodiment, it was explained that the photographed-image-of-interest generation section 12 generates, as a photographed image of interest, the narrow field-of-vision region N which is the center portion of the photographed image G. However, the application of the present invention is not limited thereto. Alternatively, it is also possible as a matter of course to employ this photographed image G as it is as the photographed image of interest, in case the photographed image G is acquired by a camera 5 having a narrow viewing angle corresponding to the narrow field-of-vision region N, for example. In such case, advantageously, the determination of presence/absence of an object 7 in the outside region O is effected with detection by a sonar or the like, for instance.

INDUSTRIAL APPLICABILITY

The present invention is applicable to an obstacle alert device for indicating clearly presence of an obstacle approaching a vehicle to a vehicle occupant.

DESCRIPTION OF REFERENCE MARKS/NUMERALS

1: vehicle
7: object
11: photographed image acquisition section
12: photographed-image-of-interest generation section
14: object presence determination section
16: clear indication image outputting section
19: masked region setting section
30: motion image outputting section
100: obstacle alert device
G: photographed image
M: masked region
O: outside region

The invention claimed is:
1. An obstacle alert device comprising:
a photographed image acquisition section acquiring a photographed image photographing a scene in the periphery of the vehicle;
a photographed-image-of-interest generation section generating a photographed image of interest based on the photographed image;
a masked region setting section setting a masked region making un-displayed at least a portion of the scene of the vehicle periphery in the photographed image of interest;
an object presence determination section determining whether an object is present or not in an outside region outside the photographed image of interest;
a clear indication image outputting section outputting a clear indication image including a clear indication indicator clearly indicating presence of the object to be displayed at an end of the photographed image of interest on the side of the outside region where the object is present in case the object in the outside region moves to the side of a region corresponding to the photographed image of interest; and
a motion image outputting section outputting an image in which the clear indication indicator becomes absorbed from the side of the masked region where the object is present in case the object in the outside region has entered the region corresponding to the photographed image of interest.

2. The obstacle alert device according to claim 1, wherein the motion image outputting section is configured to change a displaying color of the masked region from a position where the clear indication indicator has been absorbed, in association with the absorption of the clear indication indicator into the masked region.

3. The obstacle alert device according to claim 1, wherein the masked region is set at an upper portion of the monitoring screen.

* * * * *